(12) United States Patent
Oohashi et al.

(10) Patent No.: US 6,417,585 B1
(45) Date of Patent: Jul. 9, 2002

(54) VEHICULAR AC GENERATOR

(75) Inventors: Atsushi Oohashi; Yoshihito Asao; Shinji Nakashima, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/568,497

(22) Filed: May 11, 2000

Related U.S. Application Data (63) Continuation of application No. PCT/JP98/04120, filed on Sep. 11, 1998.

(51) Int. Cl.⁷ .............................. H02K 9/06; H02K 5/04; H02K 5/20; H02K 19/22
(52) U.S. Cl. ............................ 310/58; 310/89; 310/258
(58) Field of Search .............................. 310/89, 62, 63, 310/263, 58, 59, 60 R, 258

(56) References Cited

U.S. PATENT DOCUMENTS

| | | | | |
|---|---|---|---|---|
| 4,684,835 A | * | 8/1987 | Kline et al. .................... | 310/59 |
| 5,095,235 A | | 3/1992 | Kitamura | |
| 5,650,675 A | * | 7/1997 | Kanaya et al. ................ | 310/58 |
| 5,693,992 A | | 12/1997 | Kurusu et al. | |

FOREIGN PATENT DOCUMENTS

| | | | | |
|---|---|---|---|---|
| DE | 3514207 A1 | | 10/1986 | |
| FR | 2745439 A1 | | 8/1997 | |
| JP | 56-071446 A | * | 6/1981 | ................... 310/62 |
| JP | 56-129548 A | * | 10/1981 | ................... 310/63 |
| JP | 57-6551 | | 1/1982 | |
| JP | 04-140043 A | * | 5/1992 | ................ 310/263 |
| JP | 7-79543 | | 3/1995 | |
| JP | 09-172752 A | * | 6/1997 | ................... 310/89 |
| JP | 11-332178 A | * | 11/1999 | ................... 310/62 |

* cited by examiner

*Primary Examiner*—Karl Tamai
(74) *Attorney, Agent, or Firm*—Sughrue Mion, PLLC (57) ABSTRACT

The present invention has been made aiming at decreasing sound pressure of the cooling wind and increasing cooling effect of the vehicular ac generator. The arrangement is such that a case is composed of a pair of opposing brackets having exhaust port ribs, defining a plurality of exhaust ports and intake port ribs disposed inner side of said exhaust ports and defining a plurality of intake ports, that exhaust port ribs of at least one of the brackets are tilted from 20° to 50° in the direction of rotation of the rotor with respect to the radial direction of the rotor and that the rib thickness of the exhaust port ribs in the normal plane of the tilt direction of the exhaust port ribs are equal to or less than 50% of the exhaust port width.

9 Claims, 12 Drawing Sheets

→ COOLING AIR

→ COOLING AIR

VEHICULAR AC GENERATOR

CROSS REFERENCE TO RELATED APPLICATION

This is a continuation of International Application PCT/JP98/04120, with an internaltional filing date of Sep. 11, 1998.

TECHNICAL FIELD

This invention relates to a vehicular ac generator having a bracket having formed in a bracket main body an air intake port rib and an air exhaust port rib for defining a cooling air intake port and exhaust port.

BACKGROUND ART

Figure 9:
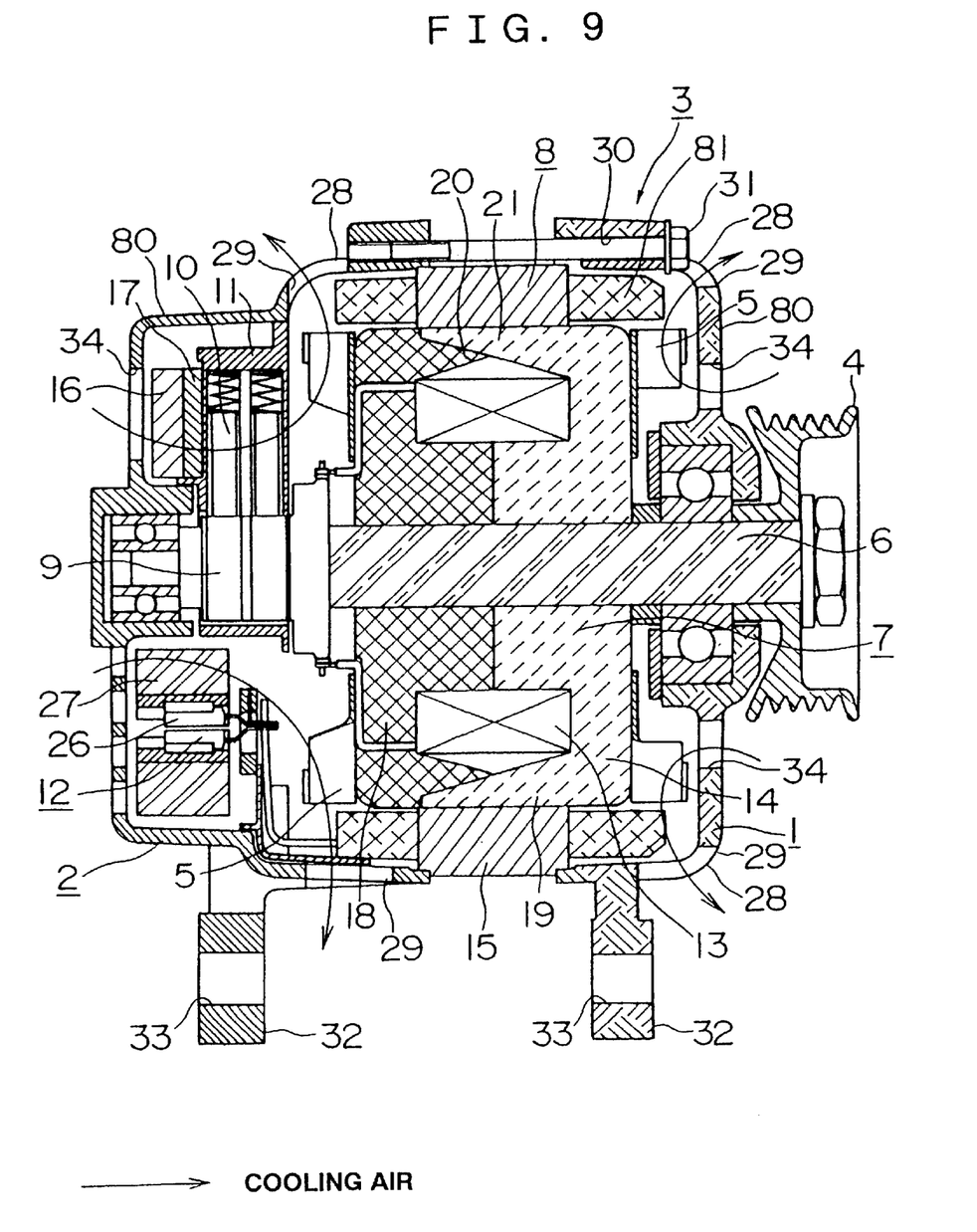
FIG. 9 is a sectional side view of the conventional vehicular ac generator.
Figure 10:
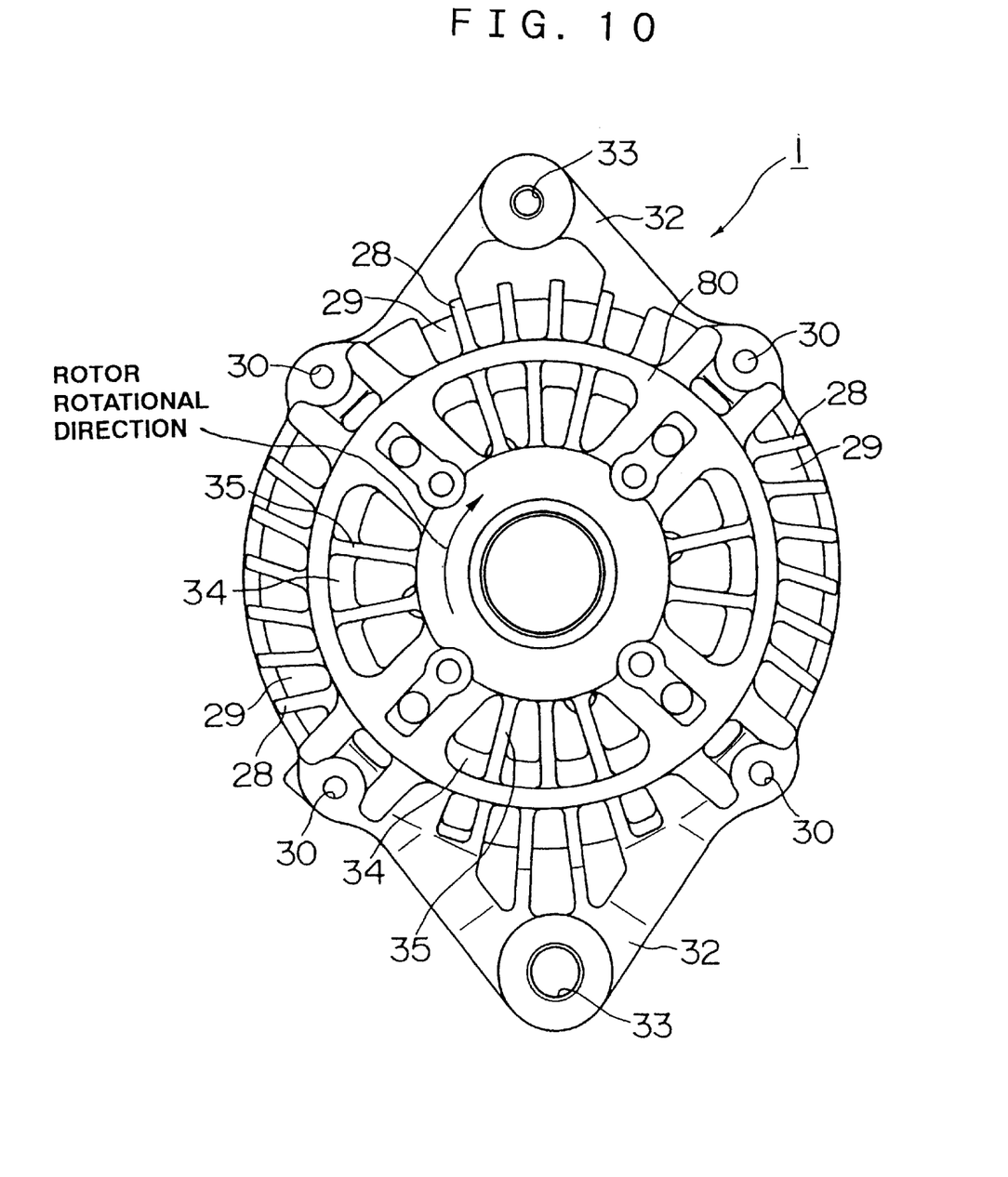
FIG. 10 is a front view of the conventional front bracket.
Figure 11:
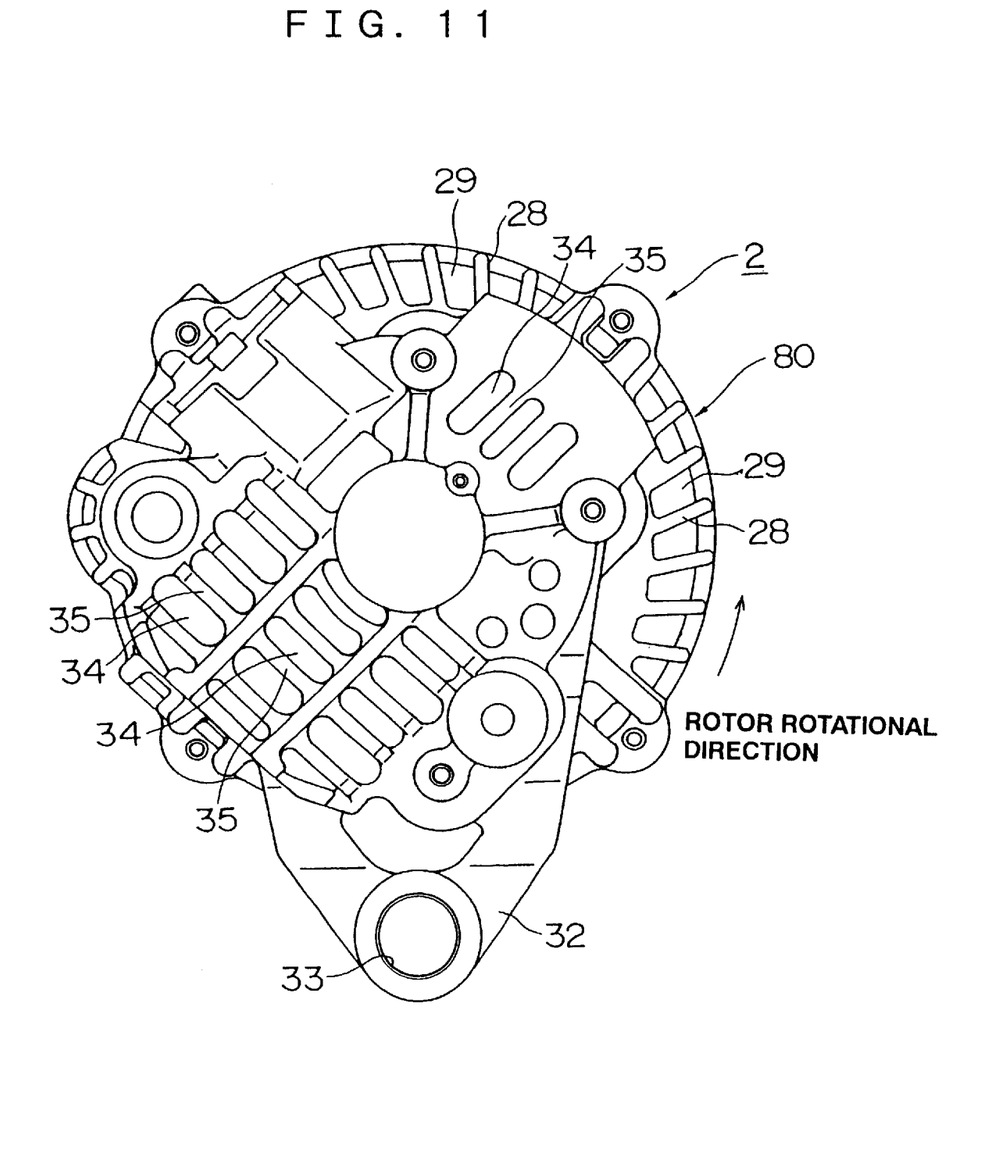
FIG. 11 is a front view of the conventional rear bracket.
Figure 12:
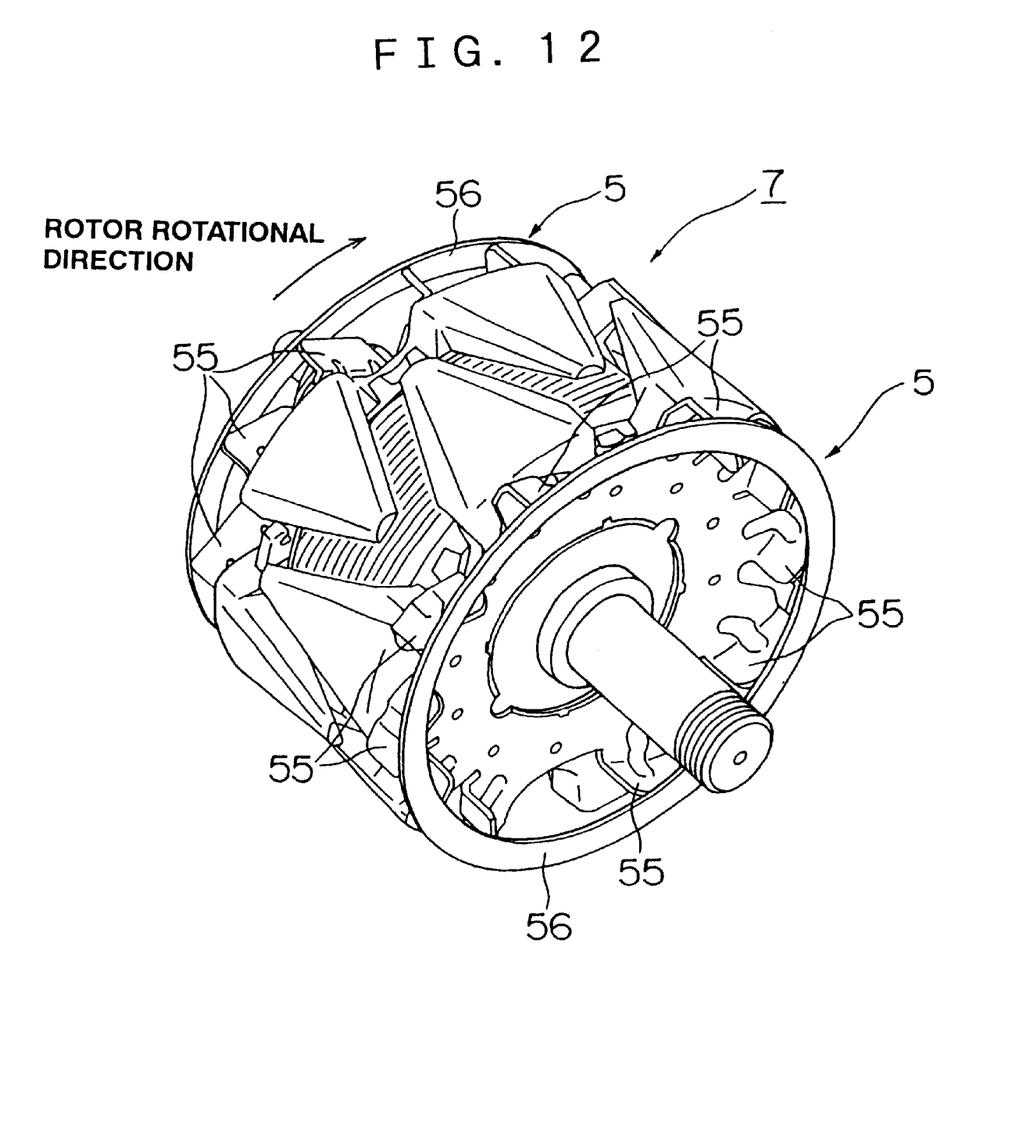
FIG. 12 is a perspective view of the conventional rotor.

FIG. 9 is a side sectional view of a conventional vehicular ac generator, FIG. 10 is a front view of the front bracket shown in FIG. 9, FIG. 11 is a front view of the rear bracket shown in FIG. 9 and FIG. 12 is a perspective view of a rotor.

This ac generator comprises a case 3 composed of a front bracket 1 and a rear bracket 2 made of aluminum, a shaft 6 disposed within the case 3 and having secured to its one end portion a pulley 4, a rotor 7 of the Rundle type fixed to the shaft 6, a fan 5 secured to the opposite side of the rotor 7, a stator 8 secured to the inner wall surface of the case 3, a slip ring 9 secured to the other end portion of the shaft 6 for supplying an electric current to the rotor 7, a pair of brushes 10 in a sliding-contact relationship with the slip ring 9, a brush holder 11 housing the brushes 10, a commutator 12 electrically connected to the stator 8, a heat sink 16 mounted to the brush holder 11 and a regulator 17 bonded to the heat sink 16 and regulating the magnitude of the ac voltage generated at the stator 8.

The rotor 7 comprises a rotor coil 13 through which an electric current is supplied to generate a magnetic flux and a pole core 14 positioned over the rotor coil 13, where an magnetic poles are formed by the magnetic flux. The pole core 14 is composed of a pair of a first pole core member 18 and a second pole core member 19 meshing with each other. The first pole core member 18 and the second pole core member 19 comprises pawl-shaped magnetic poles made of iron and in the shape of a pawl. The neighboring pawl-shaped magnetic poles 20 and 21 are arranged with a predetermined gap is defined between the magnetic poles so that no flux leakage occurs between the pawl-shaped magnetic poles 20 and 21 and that a cooling air passage for cooling the rotor coil 13 is defined.

The stator 8 comprises a stator core 15 and a stator coil 81 which is an electrical conductor wound on the stator core 15 and in which an ac power is generated due to the change in the magnetic flux in the rotor coil 13 as the rotor 7 rotates.

The rectifier 12 comprises a diode 26 for rectifying the ac current generated in the stator 8 into a dc current and a heat sink 27 for dissipating the heat generated at the diode 26.

As shown in FIG. 10, the front bracket 1 has disposed at an outer circumferential portion of the bracket main body 80 a plurality of exhaust ports 29 formed by a plurality of exhaust port ribs 28. Inside of the exhaust port 29, intake ports 34 are defined by a plurality of intake ribs 35. Also, at the outer circumferential portion of the bracket main body 80, through holes 30 are formed at four positions spaced by 90°. Bolts 31 are inserted into these through holes 30 and thread-engaged into the rear bracket 2, whereby the rear bracket 2 together with the front bracket 1 holds the stator core 15 therebetween. Also, mounting holes 33 are provided at a pair of mounting leg portions 32 arranged in the V-shape. Bolts (not shown) are passed through the mounting holes 33 and thread-engaged with the engine main body (not shown), whereby the vehicular ac generator is secured to the engine main body.

Also as for the rear bracket 2, as illustrated in FIG. 11, similarly to the front bracket 1, the exhaust ports 29 are defined in the outer circumferential portion of the bracket main body 80 by the plurality of exhaust port ribs 28 and the intake ports 34 are defined in side of the exhaust ports 29 by the intake port ribs 35. Also, mounting leg portions 32 having the mounting holes 33 corresponding to the front bracket 1 are provided.

According to the vehicular ac generator having the above structure, an electric current is supplied form a battery (not shown) to the rotor coil 13 through the brush 10 and the slip ring 9 to generate a magnetic flux, thereby magnetizing the pawl-shaped magnetic pole 20 of the first pawl core member 18 in the N-pole and the pawl-shaped magnetic pole 21 of the second pawl core member 19 into the S-pole. On the other hand, the pulley 4 is driven by the engine and the shaft 6 causes the rotation of the rotator 7 to rotate, so that a rotating field is applied to the stator coil 81 to generate an electromotive force in the stator coil 81. This ac electromotive force is rectified into a dc current through the rectifier 12 and regulated in its magnitude by the regulator 17 to thereby charged in the battery.

The rotor coil 13 and the stator coil 81 always generate heat during the power generation. On the other hand, the fan 5 is rotating for dissipating the heat generated by the power generation.

That is, as shown in FIG. 9, the cooling air sucked in the axial direction through the intake ports 34 on the side of the front bracket 1 flows between the intake port ribs 35 deflected into the centrifugal direction by the fan 5, cools the front side end positron of the stator coil 81 and is exhausted to the outside through the exhaust ports 29 between the exhaust port ribs 28. Also, the cooling air sucked through the intake ports 29 defined between the exhaust port ribs 28 flows between the intake port rib 35, flows through the heat sink 27 of the rectifier 12 and the heat sink 16 of the regulator 17, deflected by the fan 5 in the A centrifugal direction, cools the rear side of the stator coil 81 and is exhausted to the outside through the exhaust ports 29 of the rear bracket 2.

As for the fan 5, the centrifugal fan 5 having a plurality of fan blades 55 is used as illustrated in FIG. 12, so that the air flow is deflected by the fan blades 55 at right angles and exhausted in the axial direction, generating pressure oscillation due to the conflicts between the fan blades 55 and the air at the flow incoming portion, giving an adverse effect in the wind noise. Also, an annular plate 56 fastened to connect the tips of the fan blades together is provided for the purpose of noise reduction.

It is to be noted that the intake ports ribs 29, the exhaust port ribs 35 and the front and rear brackets 1 and 2 not only prevent the ingress of any foreign matter from outside, but also serves and cooling fins for dissipating the heat transmitted from the stator 8 to the front and the rear brackets 1 and 2.

The exhaust port ribs 28 of the front and rear brackets 1 and 2 of this conventional design have not been tilted or inclined in the direction rotation of the rotor by an angle equal to or within 0° to 15° with respect to the radial line from the rotational axis. Also, the intake port ribs 35 of the front bracket 1 have not had any inclination with respect to the radiation line from the rotational axis. With such the structure, a air flow resistance relative to the direction of the absolute velocity of the cooling air discharged from the fan 5 of the rotor 7 is large and the flow rate has been limited, so that the cooling efficiency has been poor. Therefore, the temperature rise is increased and, as a result, the power output had to be limited. Also, as for the intake ports 34, although the air flows with an inclination due to the whirling component of the incoming air generated by the rotation of the fan 5, the intake port ribs 35 cause the air flow resistance to be large, resulting in the decrease in air flow amount.

Also, since the exhaust port ribs 28 and the intake port ribs 35 have not been in line with the direction of the absolute velocity of the cooling air discharged from the fan 5, the interfering noise was increased.

This invention has been made in order to resolve the above-discussed problems and has as its object the provision of a vehicular ac generator of a low noise and high cooling efficiency and capable of being increased in output power by selecting optimum values of the angles, thickness and the like of the exhaust port ribs and the intake port ribs of the bracket.

DISCLOSURE OF INVENTION

In order to achieve the above object, the present invention resides in a vehicular ac generator comprising a case composed of a pair of opposing brackets having exhaust port ribs defining a plurality of exhaust ports and intake port ribs disposed inner side of the exhaust ports and defining a plurality of intake ports; a rotor rotatably disposed within the case; a stator secured within the case and having a stator coil in which an ac current is generated by a rotating magnetic field generated by the rotor; and a pair of fan secured at the axially opposite sides of the rotor for generating a flow of cooling air sucked through the intake ports of the bracket to cool the stator coil and exhausted to outside from the exhaust ports; characterized in that the exhaust port ribs of at least one of the brackets are tilted from 20° to 50° in the direction of rotation of the rotor with respect to the radial direction of the generator.

The rib thickness of the exhaust port ribs in the normal plane of the tilt direction of the exhaust port ribs may be equal to or less than 50% of the exhaust port width.

When the rotor rotates the fan rotates to suck air from the intake ports of the bracket which cools the rear side end portions and the front side end portions of the stator coil and which exhausts from the exhaust ports. The air exhausted from the exhaust ports is exhausted at a predetermined angle with respect to the radial line from the rotary axis due to the whirling component due to the rotation of the fan.

According to experiments, as the tilt angle of the exhaust port ribs is increased, the power output increases up to about 50° which is believed to be the most preferable angle and, the further increase of the tilt angle causes the output to sharply decrease. On the other hand, the wind noise sound pressure sharply is decreased up until about 20°, kept about constant from 20° to 60° and has a transition point at about 60° from where it is decreased again.

Therefore, when the tilt angle of the exhaust port ribs is set at from 20° to 50° in the direction of rotation of the rotor, both the power output and the wind noise can be made satisfactory.

Also, the rib thickness of the exhaust port ribs in the normal plane of the tilt direction of the exhaust port ribs may preferably be equal to or less than 50% of the exhaust port width.

According to the experiments, as the rib thickness relative to the exhaust port width is increased, the power output is gradually increased and, with a transition point at about 0.5, it is sharply decrease. Contrary to this, the wind noise does not change much because the angle is set at from 20° to 50° which is close to the velocity vector of the exhausted cooling air.

The intake port ribs of at least one of the brackets may be tilted from 25° to 35° in the direction opposite to the direction of rotation of the rotor with respect to the radial line from a rotational axis.

As for the intake ports, the air flow is also sucked at a predetermined tilt angle with respect to the radial line from the rotary axis due to the whirling component due to the rotation of the fan, so that there is an optimum angle as in the exhaust port ribs. According to the experiments, when the tilt angle of the intake port ribs is set at from 20° to 50°, both the power output and the wind noise can be made satisfactory.

Also, the side surfaces of the intake port ribs on side of the rotational direction of the fan may preferably be tilted from 10° to 20° with respect to the axis in a plane perpendicular to the intake port ribs.

With such arrangement, the incoming air flow is smoothly introduced.

The ratio of the width in the circumferential direction of the intake port may be made equal to the ratio between the diameter of the innermost edge of the ports and the diameter of the outermost edge of the ports.

Also, a taper of from 40° to 50° may be provided in the inner circumferential surface on the outermost diameter side of the intake port so that the diameter gradually decreases from the outer air side toward the case inner portion.

Further, the fan may be provided with an annular plate connecting the tip of each fan blade and wherein the taper in the inner circumferential surface on the outermost diameter side of the intake port is formed with the inner diameter of said annular plate used as the base point.

BRIEF DESCRIPTION OF THE DRAWINGS

The present invention will become more readily apparent from the following detailed description of the preferred embodiments of the present invention taken in conjunction with the accompanying drawings, in which.

BEST MODE FOR CARRYING OUT THE INVENTION

In order to describe the present invention in detail, embodiments of the present invention will described in conjunction with the accompanying drawings. In the following description, the components identical to those of the conventional example will be described with the same reference numerals attached thereto.

Figure 1A:
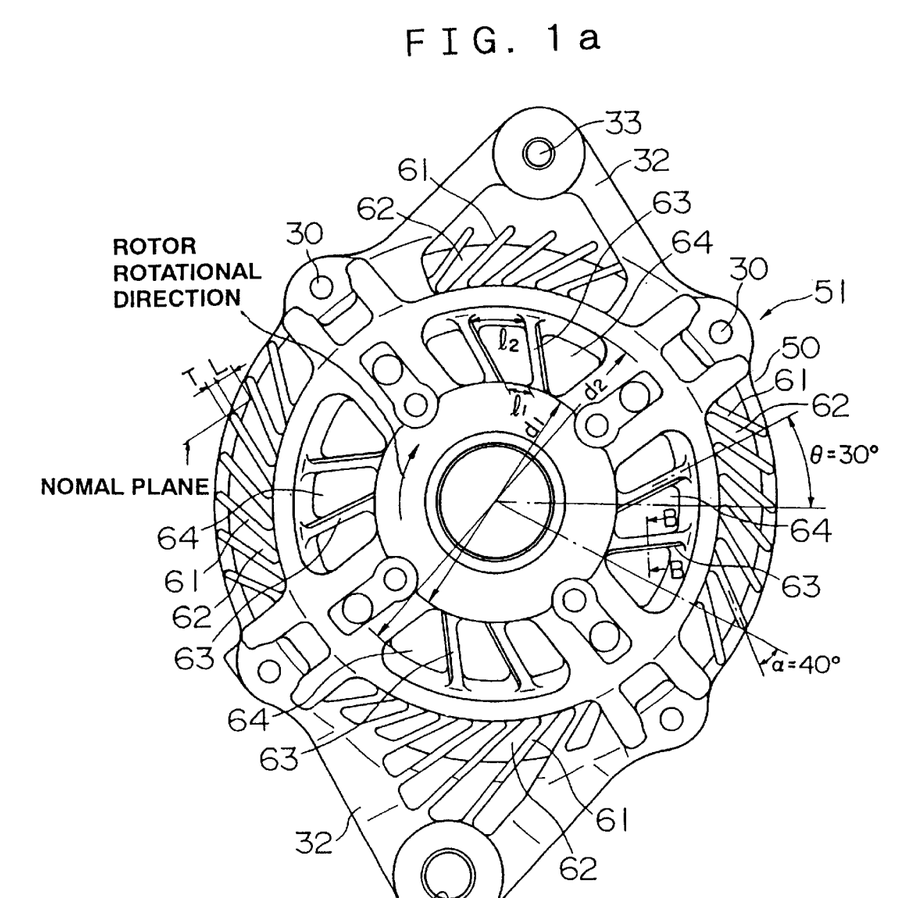
FIG. 1(a) is a front view of the front bracket of the vehicular ac generator of one embodiment of the present invention and FIG. 1(b) is a sectional view taken along line B—B of FIG. 1(a)
Figure 1B:
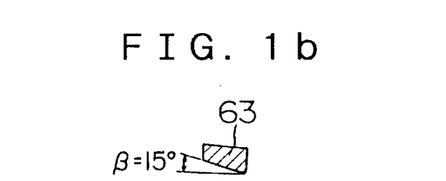
Figure 2:
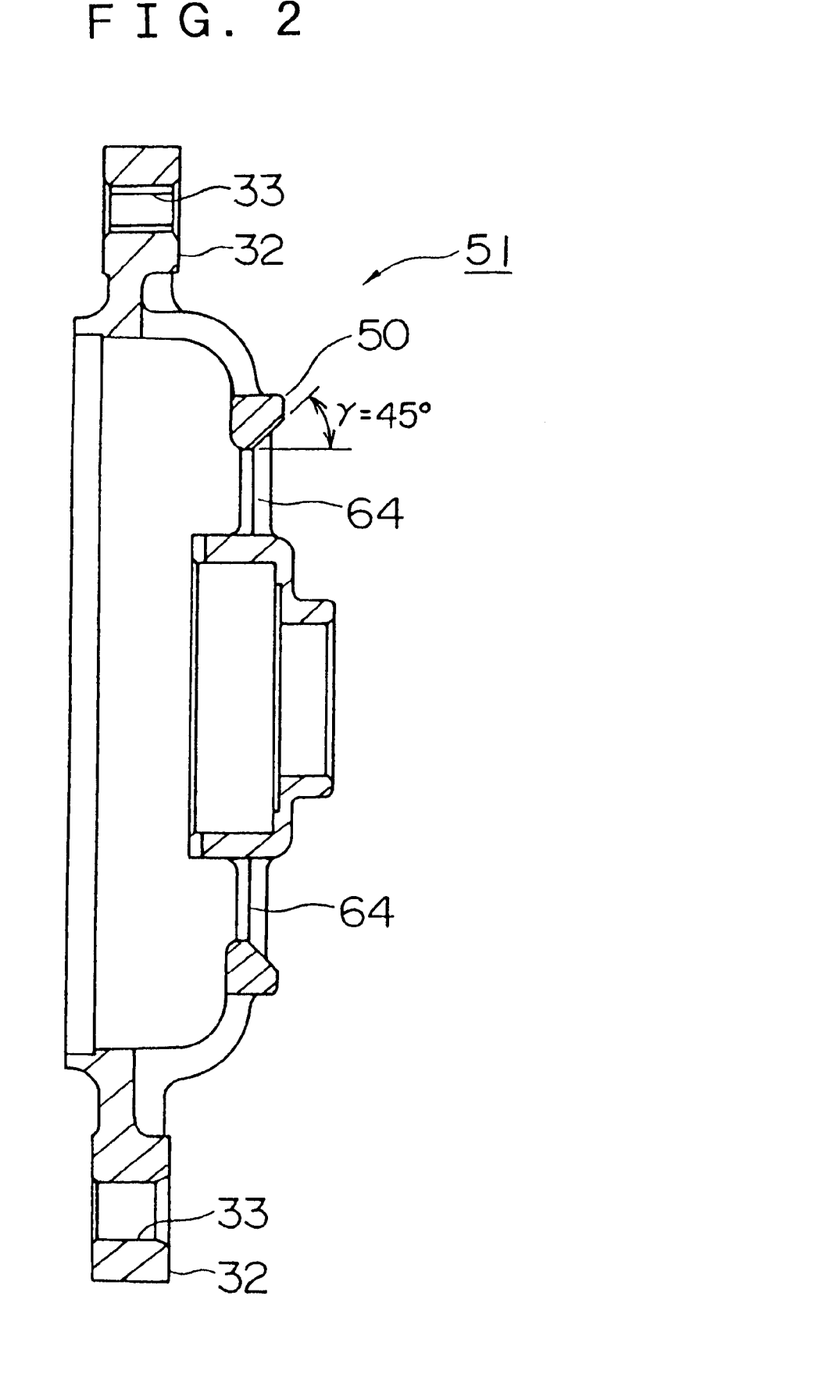
FIG. 2 is a sectional view of the front bracket of FIG. 1.
Figure 3:
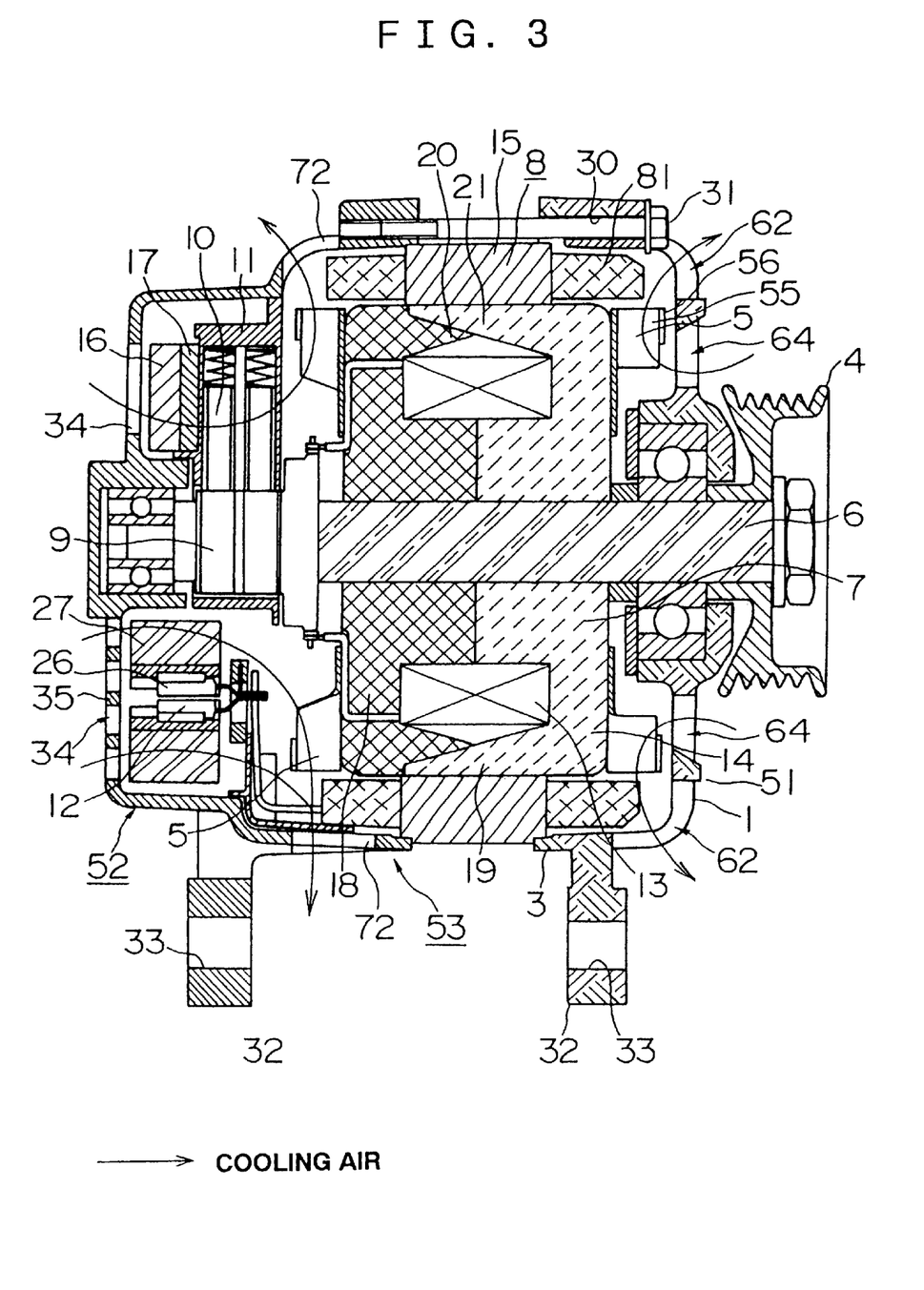
FIG. 3 is a sectional side view of the vehicular ac generator to which the front bracket shown in FIG. 1 is applied.
Figure 4:
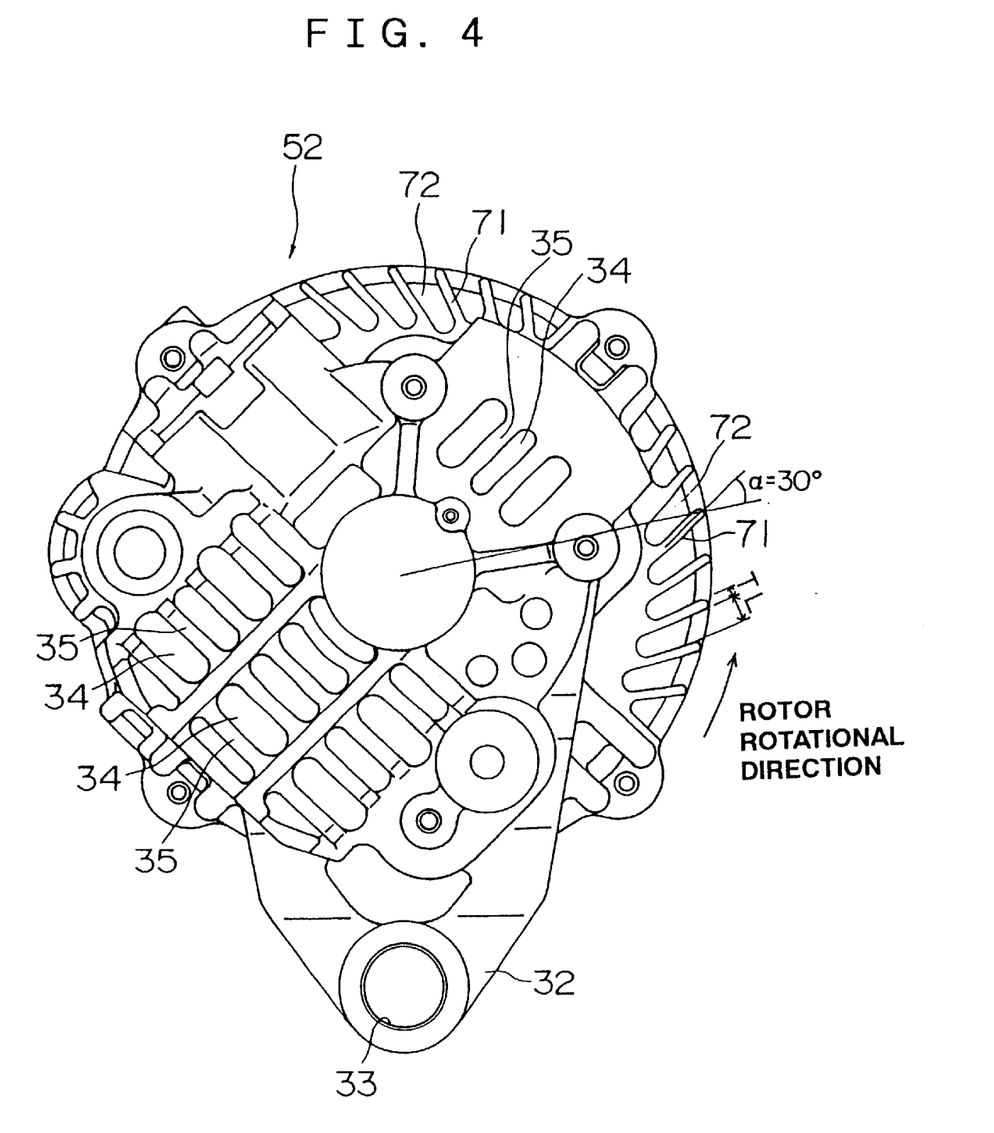
FIG. 4 is a front view of the rear bracket of the vehicular ac generator of FIG. 3.

FIG. 1 is a front view of the front bracket of one embodiment of the present invention, FIG. 2 is a sectional view of the front bracket of FIG. 1, FIG. 3 is a sectional side view of the vehicular ac generator and FIG. 4 is a front view of the rear bracket of the vehicular ac generator of FIG. 3;

The vehicular ac generator comprises, as shown in FIG. 3, a case 53 composed of a front bracket 51 and a rear bracket 52 made of aluminum, a shaft 6 disposed within the case 53 and having secured to its one end portion a pulley 4, a rotor 7 of the Rundle type fixed to the shaft 6, a fan 5 secured to the opposite sides of the rotor 7, a stator 8 secured to the inner wall surface of the case 53, a slip ring 9 secured to the other end portion of the shaft 6 for supplying an electric current to the rotor 7, a pair of brushes 10 in a sliding-contact relationship with the slip ring 9, a brush holder 11 housing the brushes 10, a commutator 12 electrically connected to the stator 8, a heat sink 16 mounted to the brush holder 11 and a regulator 17 bonded to the heat sink 16 and regulating the magnitude of the ac voltage generated at the stator 8.

The rotor 7 comprises a rotor coil 13 through which an electric current is supplied to generate a magnetic flux and a pole core 14 positioned over the rotor coil 13, where an magnetic poles are formed by the magnetic flux. The pole core 14 is composed of a pair of a first pole core member 18 and a second pole core member 19 meshing with each other. The first pole core member 18 and the second pole core member 19 comprises paw-shaped magnetic poles made of iron and in the shape of a pawl. The neighboring paw-shaped magnetic poles 20 and 21 are arranged with a predetermined gap is defined between the magnetic poles so that no flux leakage occurs between the pawl-shaped magnetic poles 20 and 21 and that a cooling air passage for cooling. the rotor coil 13 is defined.

The stator 8 comprises a stator core 15 and a stator coil 81 which is an electrical conductor wound on the stator core 15 and in which an ac power is generated due to the change in the magnetic flux in the rotor coil 13 as the rotor 7 rotates.

The rectifier 12 comprises a diode 26 for rectifying the ac current generated in the stator 8 into a dc current and a heat sink 27 for dissipating the heat generated at the diode 26.

As shown in FIGS. 1 and 2, the front bracket 51 has disposed at an outer circumferential portion of the bracket main body 50 a plurality of exhaust ports 62 formed by a plurality of exhaust port ribs 61. Inside of the exhaust port 62, intake ports 34 are defined by a plurality of intake ribs 63. Also, at the outer circumferential portion of the bracket main body 80, through holes 30 are formed at four positions spaced by 90°. Bolts 31 are inserted into these through holes 30 and thread-engaged into the rear bracket 2, whereby the rear bracket 2 together with the front bracket 1 holds the stator core 15 therebetween. Also, mounting holes 33 are provided at a pair of mounting leg portions 32 arranged in the V-shape. Bolts (not shown) are passed through the mounting holes 33 and thread-engaged with the engine main body (not shown), whereby the vehicular ac generator is secured to the engine main body.

Also as for the rear bracket 52 similarly to the front bracket 51, the exhaust ports 72 are defined in the outer circumferential portion of the bracket main body 50 by the plurality of exhaust port ribs 28 and the intake ports 34 are defined in side of the exhaust ports 72 by the intake port ribs 35. Also, mounting leg portions 32 having the mounting holes 33 corresponding to the front bracket 51 are provided.

According to the vehicular ac generator having the above structure, an electric current is supplied form a battery (not shown) to the rotor coil 13 through the brush 10 and the slip ring 9 to generate a magnetic flux, thereby magnetizing the pawl-shaped magnetic pole 20 of the first pawl core member 18 in the N-pole and the pawl-shaped magnetic pole 21 of the second pawl core member 19 into the S-pole. On the other hand, the pulley 4 is driven by the engine and the shaft 6 causes the rotation of the rotor 7 to rotate, so that a rotating field is applied to the stator coil 81 to generate an electromotive force in the stator coil 81. This ac electromotive force is rectified into a dc current through the rectifier 12 and regulated in its magnitude by the regulator 17 to thereby charged in the battery.

The rotor coil 13 and the stator coil 81 always generate heat during the power generation. On the other hand, the fan 5 is rotating for dissipating the heat generated by the power generation.

That is, as shown in FIG. 3, the cooling air sucked in the axial direction through the intake ports 64 on the side of the front bracket 51 flows between the intake port ribs 63 deflected into the centrifugal direction by the fan 5, cools the front side end positron of the stator coil 81 and is exhausted to the outside through the exhaust ports 62 between the exhaust port ribs 61. Also, the cooling air sucked through the intake ports 34 on the rear bracket 52 side flows between the intake port rib 35, flows through the heat sink 27 of the rectifier 12 and the heat sink 16 of the regulator 17, deflected by the fan 5 in the centrifugal direction, cools the rear side end of the stator coil 81 and is exhausted to the outside through the exhaust ports 79 of the rear bracket 52.

As for the fan 5, the centrifugal fan 5 having a plurality of fan blades 55 is used, so that the air flow is deflected by the fan blades 55 at right angles and exhausted in the axial direction, generating pressure oscillation due to the conflicts between the fan blades 55 and the air at the flow incoming portion, giving an adverse effect in the wind noise. Also, an annular plate 56 fastened to connect the tips of the fan blades together is provided for the purpose of noise reduction.

According to this embodiment, as for the exhaust port ribs 61 and 71 of the front bracket 51 and the rear bracket 52, the tilt angle α on the rotation direction side of the rotor with respect to the radial line from the rotary axis (radial direction of the rotor) is set α=20° to 50°. In particular, in this embodiment, the exhaust port ribs 61 of the front bracket 51 is set at α=40° and the exhaust port ribs 71 of the rear bracket 52 is set at α=30°.

Also, the ratio T/L between the exhaust port length L and the thickness of the rib T in the normal plane of the tilt direction of the exhaust port ribs are equal to or less than 50% and preferably 0.4.

Further, in the front bracket 51, the ratio between the circumferential widths l1 and l2 of the outermost portion and the innermost portion of the intake port 64 is made equal to the ratio between the port innermost diameter d1 and the port outermost diameter d2, and the tilt angle θ of the intake port ribs 63 toward the direction opposite to the rotational direction of the rotor with respect to the radial line from the axis is set at from 25° to 35° and is particularly set at 30° in this embodiment.

Also, the tilt angle β of side surfaces of the intake port ribs on side of the rotational direction of the fan with respect to the axis in a normal plane to the intake port ribs 63 are set β=10° to 20°, and particularly 15° in this embodiment.

A taper angle γ of from 40° to 50° is provided in the inner circumferential surface on the outermost diameter side of the intake port 64 so that the diameter gradually decreases from the outer air side toward the inner portion of the case 53 with the inner diameter of the annular plate of the fan 5 as a starting point. In this embodiment, γ is set at 45°.

Also, as for the intake ports 34 and the intake port ribs 35 on the rear side, no angle is provided and they are open in the axial direction as in the conventional design.

During the designing of the generator of the present invention, in view of the previously discussed problems of the conventional design, the absolute velocity direction of cooling air on the intake and the exhaust sides is visualized by the tuft method. This method is to inspect the velocity vector direction of the cooling air on the basis of the stream direction of the tufts. This inspection was conducted at constant 3000 rpm of the generator rotating speed at which the temperature of the stator 8 of which output is limited and the diode of the rectifier 12 reaches at the maximum points.

According to this, it was determined that the cooling air flow is introduced with a large inclination or tilt due to the whirling component due to the rotation of the rotor 7. It was also determined according to the results of the experiments that the air flows, at the intake port 64 on the front side, with the correspondence with each set angle of the intake port ribs 63, θ=about 30° and β =about 15°, at the exhaust port 62 of the front side, with the correspondence with each set angle of the exhaust port ribs 61, α=about 40° and at the exhaust port 72 on the rear side, α=about 30°. It is to be noted that as to the intake port 35 on the rear side the flow was parallel to the axial direction. The reason for this is considered that the gap between the rear bracket 52 and the fan 5 is large and that the regulator 17, the rectifier 12 and the like which are components to be cooled are disposed between the rear bracket 52 and the fan 5.

When the rotational speed is changed up and down, this angle fluctuates by ±5° from this value and the most suitable angle exists actually at the respective rotational speed, it is reasonable to determine the optimum angle a generator rotational speed at around 300 rpm which is the highest temperature point for the stator 8 and the diode of the rectifier 12.

As the results of the measurement experiments of the power output and the temperature with the set angles of the above embodiment, the alternator having the fan with the plate utilizing this bracket has the temperature reduction effect of 25° C. for the stator 8, 16° C. for the diodes of the rectifier 12 and 8° C. for the regulator 17 as compared to the one employing the conventional bracket, and when the temperature rise is made equal to that of the conventional design to increase the power output, output increase corresponding to 3A was obtained.

Figure 5:
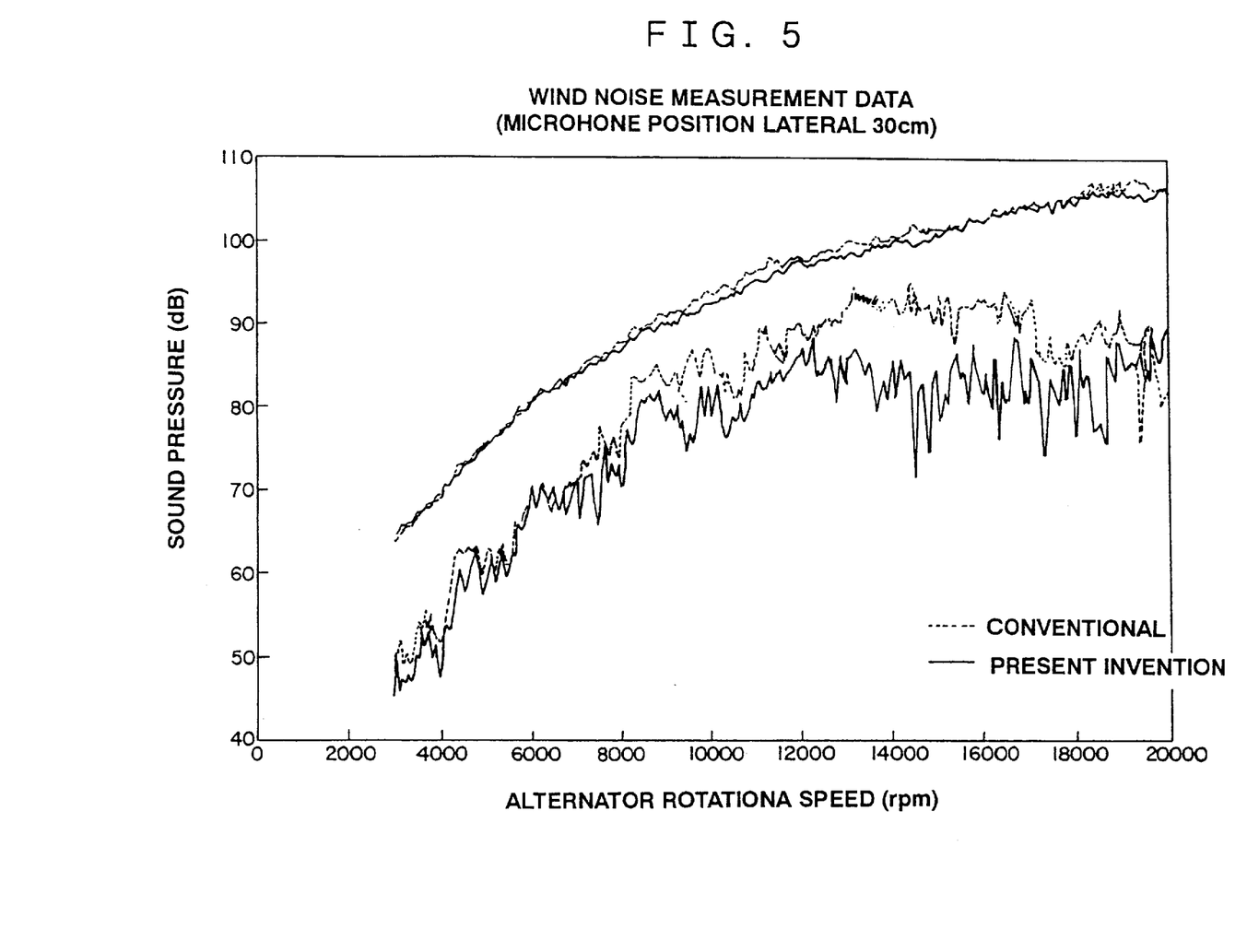
FIG. 5 is a graph for showing the comparison of the relationship between the rotating speed and the wind sound pressure level of the embodiment of the present invention and the conventional example to indicate the wind noise reducing effect of the embodiment of the present invention.

FIG. 5 illustrates the data for the wind noise.

According to this, a high frequency component annoying to ear was reduced by maximum 20 dB according to the present invention as compared to the conventional design, and at 7000 to 13000 rpm the overall value was also reduced by 2 dB.

The application of the bracket of this embodiment has realized the generator superior in wind noise, power output and temperature.

Next, in order to establish the design guides for the ac bracket of such the vehicular ac generator, experiments were conducted with models that were manufactured using the ratio T/L of the thickness of the exhaust ribs 61 and 71 relative to the exhaust ports 62 and 72 as well as the tilt angle α of the each exhaust port ribs 61 and 71 with respect to the rotational axis was used as parameters.

Figure 6:
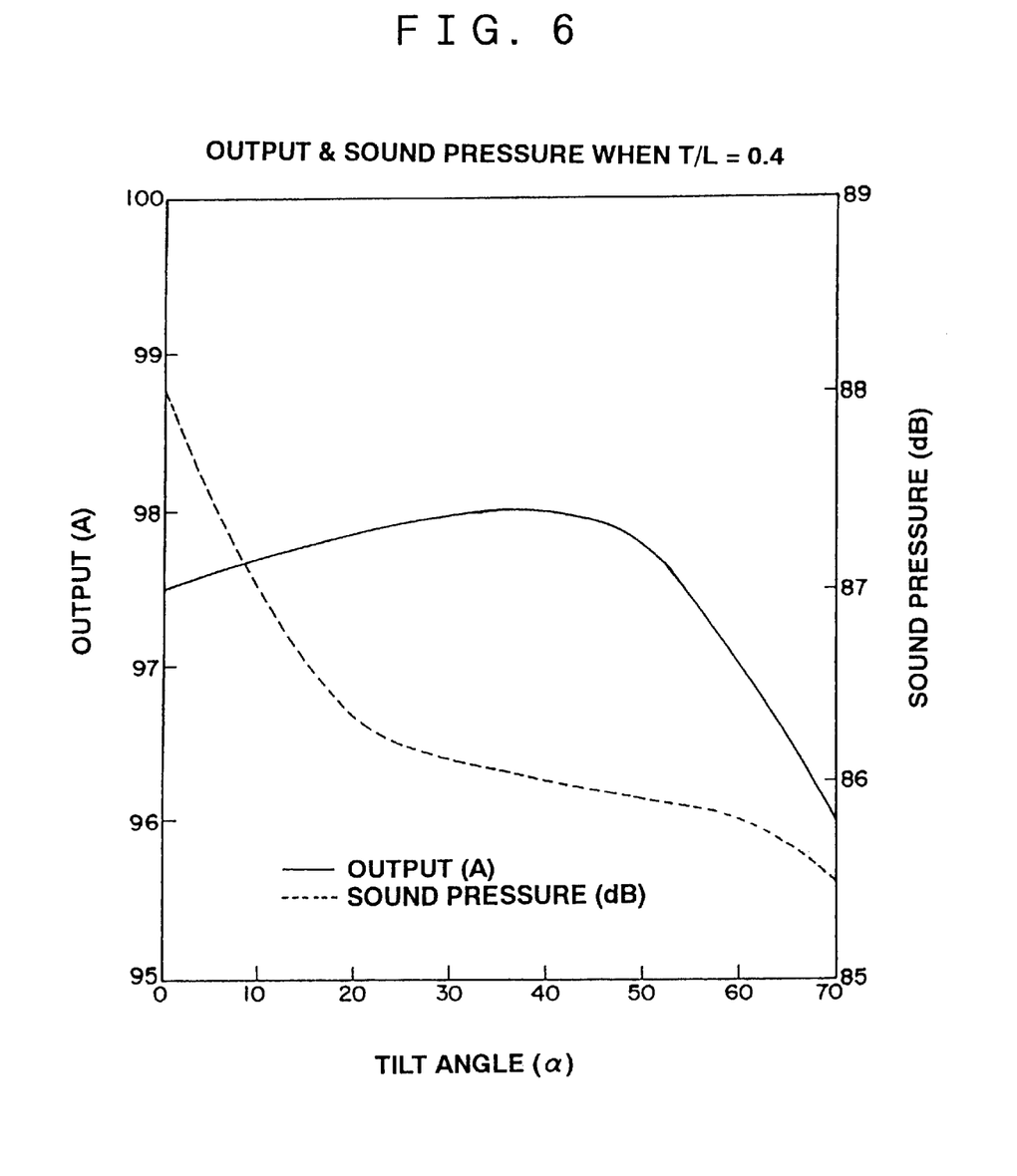
FIG. 6 is a graph showing the experiment results of the relationship between the tilt angle of the exhaust port ribs and the output and the noise sound pressure level of the embodiment of the present invention.

FIG. 6 illustrates the results of measurement of the power output and the wind noise sound pressures with the parameter of the T/L=0.4 constant as well as the tilt angle α of the exhaust port ribs 61 and 71.

The output is the value when the temperature rise at the rotation speed of 3000 rpm is made equal and the wind noise is the value at 10000 rpm. The specimen used at this has the same tilt angle α for both the exhaust port ribs 61 on the front side and the exhaust port ribs 71 on the rear side. According to this, as the tilt angle α is increased, the output is increased up to about 50° which is considered to be optimum angle and then sharply deteriorate beyond it.

The reason for this may be considered that, although the velocity vector of the cooling exhaust air includes the whirling component and the vector component in the radial direction which is the direction of exhaustion, the side surface of the exhaust port rib is tilted in the direction to which the exhaustion is efficiently achieved and is open to the vector component in the radial direction up to about 50° of the velocity vector of the cooling exhaust air, but when the angle exceeds this, a large resistance occurs with respect to the velocity vector in the radial direction and the wind flow rate is abruptly decreased.

On the other hand, the wind noise sound pressure is sharply decreased up to about 20°, is flat from 20° to 60° and has a transition point at about 60° from where it is decreased again. This is considered that, the up to about 20° the sound pressures are sharply decreased due to the decrease in interference between the exhaust port ribs and the exhausting air and that the further decrease of the sound pressures at about 60° is due to the large resistance provided by the exhaust port ribs which causes the decrease in the exhausting air flow rate.

According to these results, by setting the tilt angle α of the exhaust port ribs 61 and 71 to be 20° to 50°, the power output as well as the wind noise both can be satisfactory.

Figure 7:
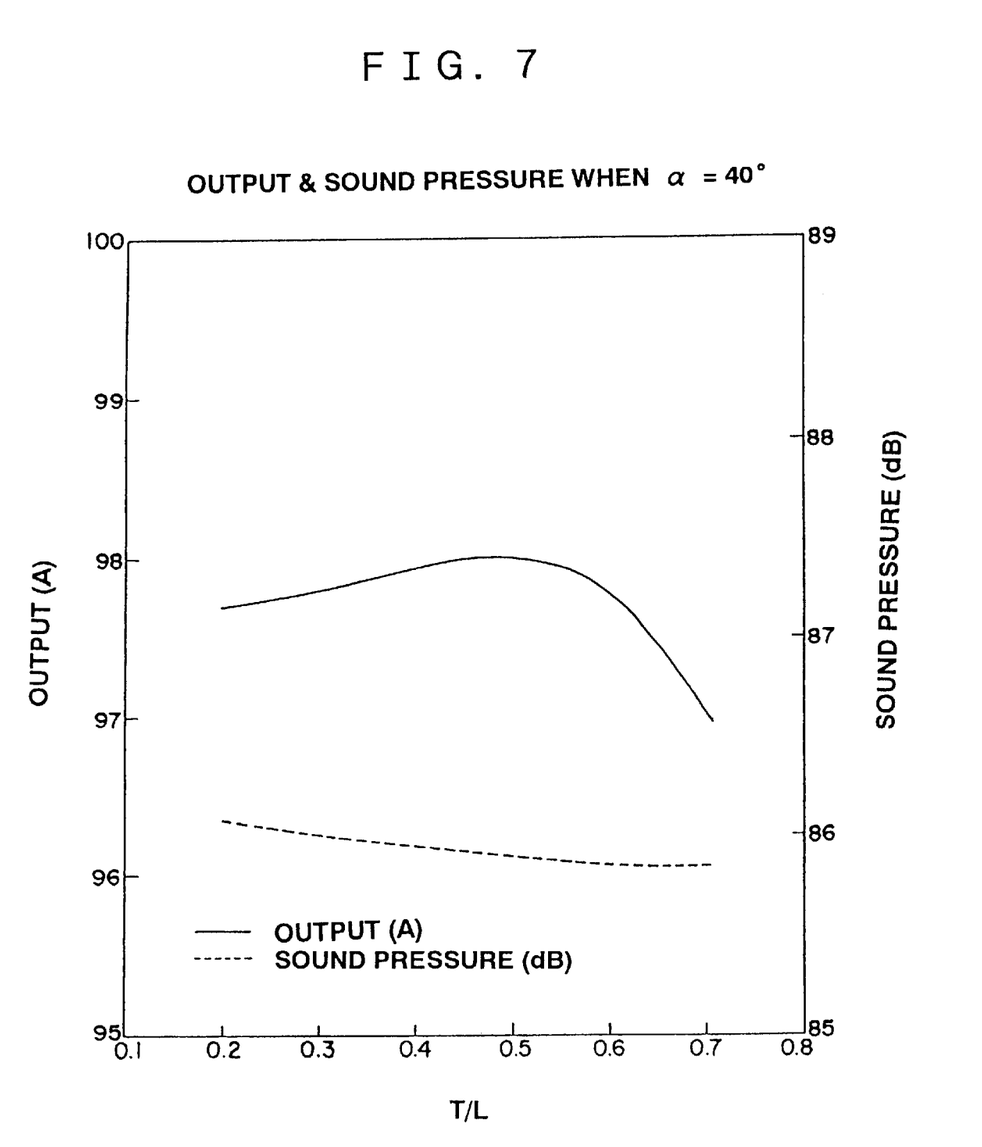
FIG. 7 is a graph showing the measurement results of the output and the sound pressure with a parameter of the ratio of the rib thickness of the exhaust port rib relative to the width of the exhaust port of the embodiment of the present invention.

FIG. 7 illustrates, as similarly to FIG. 6, the results of measurement of the power output and the wind noise sound pressures with the parameter of the ratio T/L of the exhaust port rib with respect to the exhaust port under the conditions that the tilt angle α of the exhaust port ribs is constant (α=40°), the thickness T of the exhaust port ribs is constant (T=2[mm]).

According to this, the output gradually increases as the ratio T/L is increased and then at the transition point at about 0.5 it sharply decreases. This is considered because the number of the exhaust port ribs increases as T/L is increased under a predetermined condition of a constant exhaust port rib thickness, whereby effect of the heat conducted from the stator to the exhaust port ribs as previously described being dissipated from the exhaust port ribs. However, it is considered that, even if T/L is made equal to or larger than 0.5, the exhaust ports become smaller, the power output tends to deteriorate because of the decrease in air flow rate due to increase in flow resistance.

Contrary to this, no significant change was observed in the wind noise because the tilt angle α of the exhaust port ribs is set at a constant value (40°) close to the velocity vector of the cooling exhaust air. From this results, it will be well understood that the deterioration of the output can be suppressed by making T/L equal to or less than 0.5.

From the above, a generator superior in power output as well as in wind noise property can be provided by arranging such that the exhaust port ribs are tilted from 20° to 50° in the direction of rotation of the rotor and that the rib thickness of the exhaust port ribs in the normal plane of the tilt direction of the exhaust port ribs are equal to or less than 50% of the exhaust port width.

Figure 8:
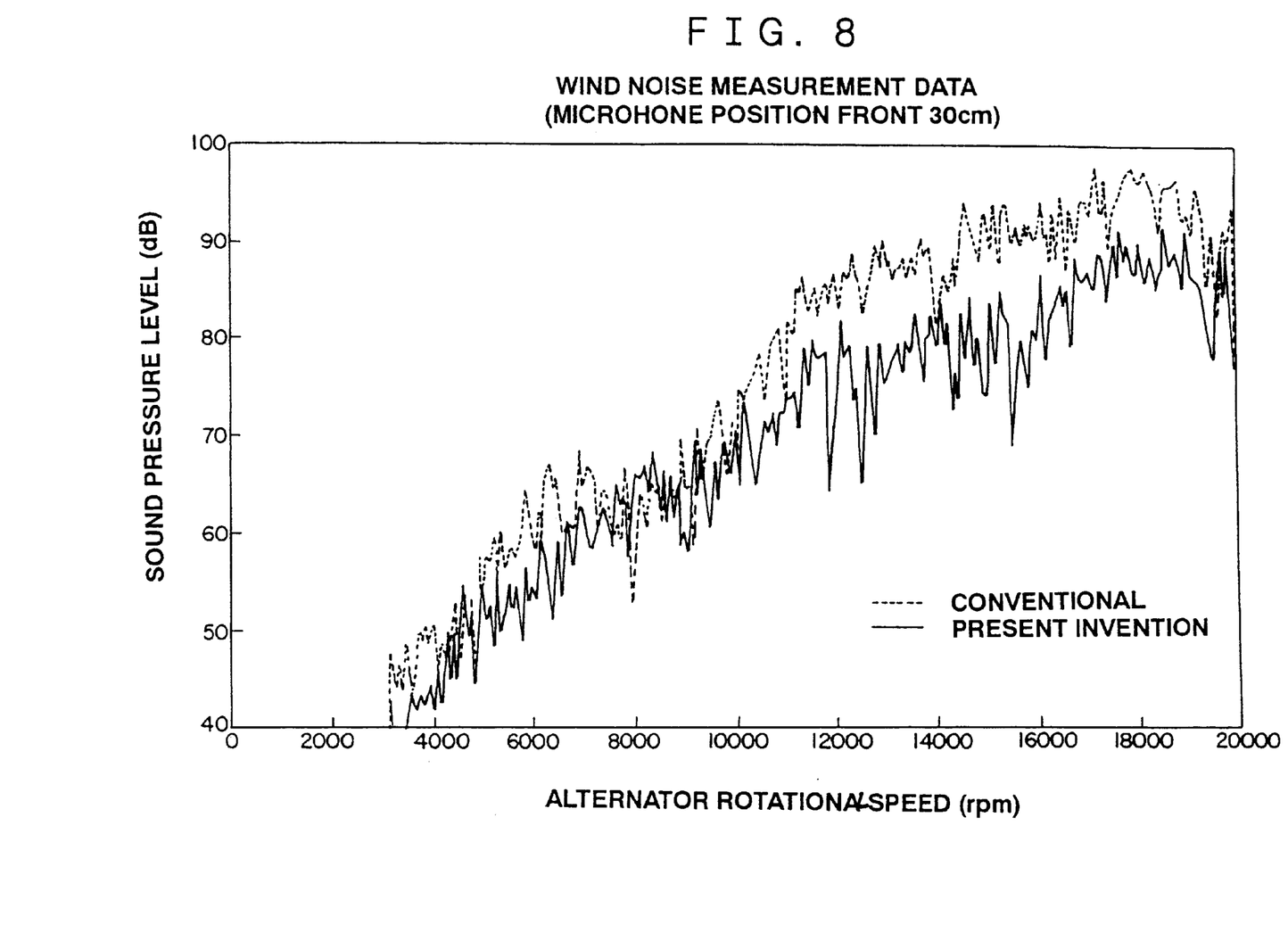
FIG. 8 is a graph for showing the comparison of the relationship between the rotating speed and the wind sound pressure level of the embodiment of the present invention and the conventional example to indicate the wind noise reducing effect of the embodiment of the present invention.

Although the optimum rib configuration for the exhaust port has been disclosed in the above, the intake ports 64 of the front bracket 51 can also be made to have a low wind noise by, as shown in FIG. 1, setting the tilt angle θ of the intake port ribs 63 toward the direction opposite to the rotational direction of the rotor with respect to the radial line from the axis is set at from 25° to 35°, the ratio between the circumferential widths l1 and l2 of the outermost portion and the innermost portion of the intake port 64 is made equal to the ratio between the port innermost diameter d1 and the port outermost diameter d2, the tilt angle β of side surfaces of the intake port ribs on the side of the rotational direction of the fan 5 are set β=10° to 20° and by setting the taper angle γ of from 40° to 50° is provided in the axial direction with the inner diameter of the annular plate of the fan 5 as a starting point to substantially match the velocity vector of the incoming air, thereby reducing the wind noise. This effect of reducing the wind noise is illustrated in FIG. 8.

Differing from the exhaust port, the wind noise was reduced in pitch tone noise due to the fan 5. Particularly, since the inner circumferential surface of the outermost diameter portion is tapered having a starting point at the inner diameter of the annular plate of the fan 5, the air is stream-lined without impinging against the annular plate and introduced smoothly into the fan blade portion.

Although the intake ports 34 and the intake port ribs 35 of the rear bracket 52 of this embodiment are not tilted as in the conventional design, they can be constructed similarly to the intake ports 63 and the intake port ribs 64 on the side of the front bracket 51 as long as the clearance between the rear bracket 52 and the fan 5 is equal to that between the front bracket 51 and the fan 5.

Also, during the shot-blasting of the bracket for eliminating burrs and for preventing the damages to the bracket when their rib portions are brought into contact due to biting, the pitch of the exhaust ports may be made uneven within the above range whereby the breakage or the like can be prevented without deteriorating the cooling and low noise properties.

INDUSTRIAL APPLICABILITY

As has been described, the vehicular ac generator of the present invention is useful as an electric power supply source for various electric devices of an automobile.

What is claimed is:

1. A vehicular ac generator comprising a case composed of a pair of opposing brackets having exhaust port ribs defining a plurality of exhaust ports and intake port ribs disposed inner side of said exhaust ports and defining a plurality of intake ports;

a rotor rotatably disposed within said case;

a stator secured within said case and having a stator coil in which an ac current is generated by a rotating magnetic field generated by said rotor; and a pair of fan secured at the axially opposite sides of said rotor for generating a flow of cooling air sucked through the intake ports of said bracket to cool said stator coil and exhausted to outside from the exhaust ports;

characterized in that said intake port ribs of at least one of said brackets are tilted from 25° to 35° in the direction opposite to the direction of rotation of said rotor with respect to the radial line from a rotational axis, and that the ratio between the width in the circumferential direction of an outermost portion and an innermost portion of said intake port bounded on circumferential sides by said intake ribs is made equal to the ratio between the diameter of the innermost edge of the ports and the diameter of the outermost edge of the ports.

2. A vehicular AC generator as claimed in claim 1, wherein said intake port ribs are thicker in an axial direction then they are wide in a circumferential direction.

3. A vehicular AC generator as claimed in claim 1, wherein said intake port ribs substantially maintain a predetermined cross-sectional shape as they extend generally radially.

4. A vehicular ac generator as claimed in claim 1, wherein side surfaces of said intake port ribs on side of the rotational direction of the fan are tilted from 10° to 20° with respect to the axis in a plane perpendicular to said intake port ribs.

5. A vehicular ac generator as claimed in claim 4, wherein the ratio between the width in the circumferential direction of an outermost portion and an innermost portion of said intake port bounded on circumferential sides by said intake ribs is made equal to the ratio between the diameter of the innermost edge of the ports and the diameter of the outermost edge of the ports.

6. A vehicular ac generator as claimed in claim 1, wherein a taper of from 40° to 50° is provided in the inner circumferential surface on the outermost diameter side of said intake port so that the diameter gradually decreases from the outer air side toward the case inner portion.

7. A vehicular ac generator as claimed in claim 6, wherein the fan is provided with an annular plate connecting the tip of each fan blade and wherein the taper in the inner circumferential surface on the outermost diameter side of the intake port is formed with the inner diameter of said annular plate used as the base point.

8. A vehicular ac generator as claimed in claim 1, characterized in that said exhaust port ribs of at least one of said brackets are tilted from 20° to 50° in the direction of rotation of said rotor with respect to the radial direction of the generator.

9. A vehicular ac generator as claimed in claim 8, wherein the rib thickness of the exhaust port ribs in the normal plane of the tilt direction of said exhaust port ribs are equal to or less than 50% of the exhaust port width.

* * * * *